(12) United States Patent
Crippa et al.

(10) Patent No.: US 8,833,529 B2
(45) Date of Patent: Sep. 16, 2014

(54) DEVICE FOR DAMPING THE VIBRATIONS IN A PAD OF A DISC BRAKE

(75) Inventors: Cristian Crippa, Almenno San Bartolomeo (IT); Remo Bonacina, Bergamo (IT); Massimo Preda, Ponte San Pietro (IT)

(73) Assignee: Freni Brembo S.p.A., Curno (IT)

( * ) Notice: Subject to any disclaimer, the term of this patent is extended or adjusted under 35 U.S.C. 154(b) by 284 days.

(21) Appl. No.: 13/380,574

(22) PCT Filed: Jun. 21, 2010

(86) PCT No.: PCT/IB2010/052776
§ 371 (c)(1),
(2), (4) Date: Feb. 29, 2012

(87) PCT Pub. No.: WO2010/150164
PCT Pub. Date: Dec. 29, 2010

(65) Prior Publication Data
US 2012/0152664 A1    Jun. 21, 2012

(30) Foreign Application Priority Data
Jun. 23, 2009 (IT) .............. MI2009A1107

(51) Int. Cl.
*F16D 65/38* (2006.01)
*F16D 65/00* (2006.01)
*F16D 125/06* (2012.01)

(52) U.S. Cl.
CPC ........ *F16D 65/0018* (2013.01); *F16D 2125/06* (2013.01)
USPC ................. 188/73.35; 188/250 D; 188/250 E (58) Field of Classification Search
USPC ............... 188/73.35–73.38, 250 E, 250 D
See application file for complete search history.

(56) References Cited

U.S. PATENT DOCUMENTS

| 4,222,463 | A | * | 9/1980 | Domes et al. ............. 188/72.3 |
| 4,445,594 | A | * | 5/1984 | Hoffman, Jr. ............. 188/73.37 |
| 4,886,147 | A | | 12/1989 | Kroniger et al. |
| 5,701,978 | A | * | 12/1997 | Weiler et al. ............. 188/73.32 |
| 7,669,699 | B2 | * | 3/2010 | Roberts et al. ............. 188/72.4 |
| 2009/0114490 | A1 | * | 5/2009 | Picot ......................... 188/73.37 |

FOREIGN PATENT DOCUMENTS

| DE | 90 02 441 U1 | 5/1990 |
| DE | 197 16 569 A1 | 10/1998 |
| DE | 100 31 904 C1 | 2/2002 |
| EP | 0 321 652 A1 | 6/1989 |

* cited by examiner

*Primary Examiner* — Melanie Torres Williams
(74) *Attorney, Agent, or Firm* — Dickstein Shapiro LLP (57) ABSTRACT

A device (10) for damping the vibrations in a pad (16) of a disc brake suitable for being mounted between at least one pad (16) and at least one piston of a caliper of a disc brake. The device (10) comprises at least one substantially cylindrical damper (26) suitable for being mounted with interference in a cavity (28) made in the piston (22). The damper (26) has an interference surface (30) comprising at least one projection (32) that extends radially and that at least partially wraps around the damper (26) according to a direction having at least one tangential component (T). The damper (26) is suitable for being fixedly connected to the piston (22) through said coupling by interference. Said interference surface (30) of the damper comprising two or more projections (32) defining an undulating axial profile (34) of said interference surface (30).

23 Claims, 6 Drawing Sheets

DEVICE FOR DAMPING THE VIBRATIONS IN A PAD OF A DISC BRAKE

The object of the present invention is a device for damping the vibrations in a pad of a disc brake.

It is known that during the braking step the disc brakes are subject to vibrations caused by movements of the caliper and/or of the pads. Such vibrations produce annoying whistles.

In the case of disc brakes there is thus a particularly great need to avoid annoying whistles from occurring.

Devices to avoid whistles occurring are known from DE 90 02 441 and also EP 0 321 652, DE 197 16 569 and DE 100 31 904.

In particular, DE 90 02 441 shows a damper mounted with interference in a cavity of a pad that, although satisfactory from many points of view, does not allow the body of the damper to work adequately since it is totally compressed or surrounded by the walls of the cavity that press upon its entire side surface.

For this purpose it is known to use devices to damp vibrations as for example described in EP872660 or U.S. Pat. No. 4,875,556. EP872660 shows a cylindrical damper that has axial projections along a central portion of the side surface. U.S. Pat. No. 4,875,556 shows an insert provided with annular projections consisting of a relatively large mass that moves in the cavity of the piston and clashes with at least one of the projections against the walls of the piston during the oscillations of the caliper. Both of the solutions do not allow the whistles due to vibrations to be eliminated.

The problem forming the basis of the present invention is to propose a device for damping the vibrations in a pad of a disc brake that has structural and functional characteristics such as to satisfy the aforementioned requirement and, at the same time, to avoid the aforementioned drawbacks.

Such a problem is solved through a device for damping the vibrations in a pad of a disc brake in accordance with claim 1. The dependent claims correspond to possible embodiments of the device according to the invention.

Further characteristics and advantages of the device for damping the vibrations in a pad of a disc brake according to the invention shall become clear from the following description of preferred example embodiments, given for indicating and not limiting which.

With reference to the aforementioned figures, reference numeral 10 wholly indicates a device for damping the vibrations in a pad of a disc brake, which will be indicated simply as device 10 hereafter.

Figure 9:
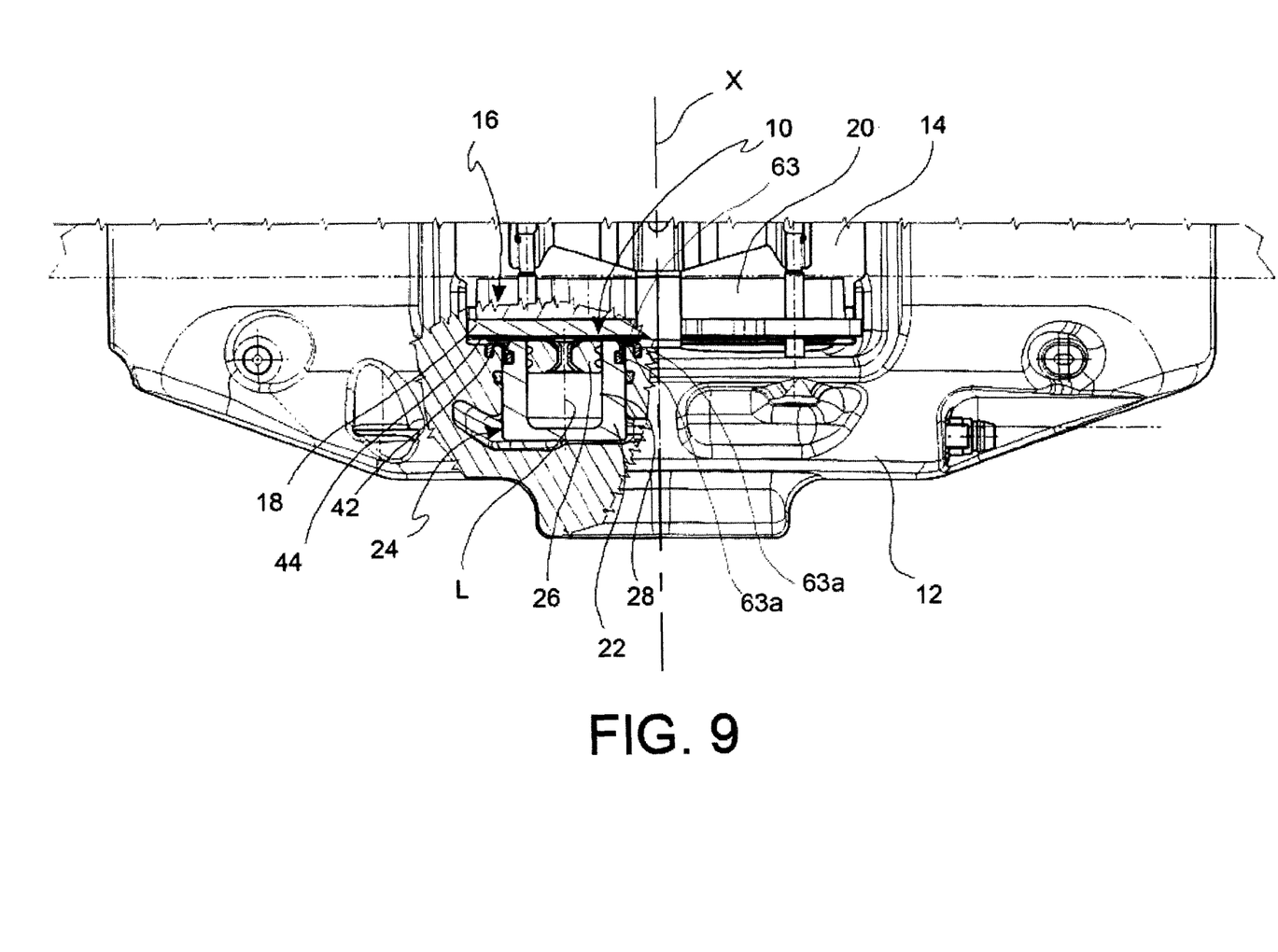
FIG. 9 illustrates a schematic partial section view of a caliper of a disc brake comprising a device according to the invention.
Figures 10, 11:
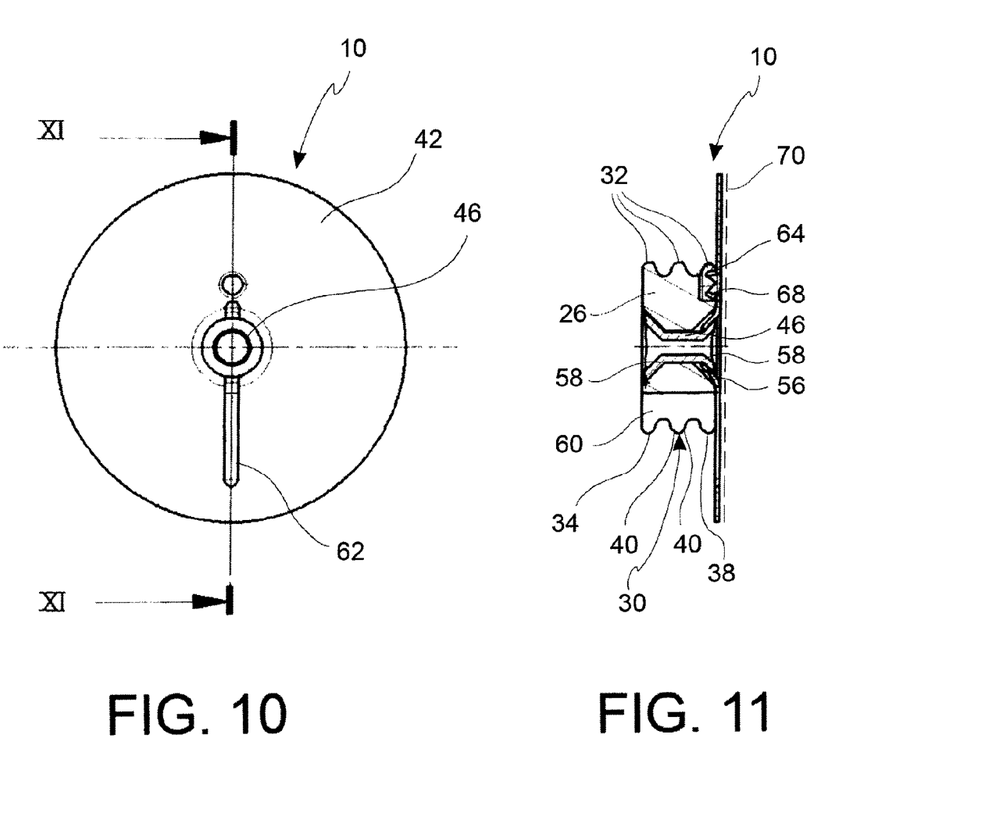
FIG. 10 illustrates a schematic view of a device according to the present invention.
FIG. 11 illustrates a section view according to the line XI-XI of FIG. 10.
Figure 12:
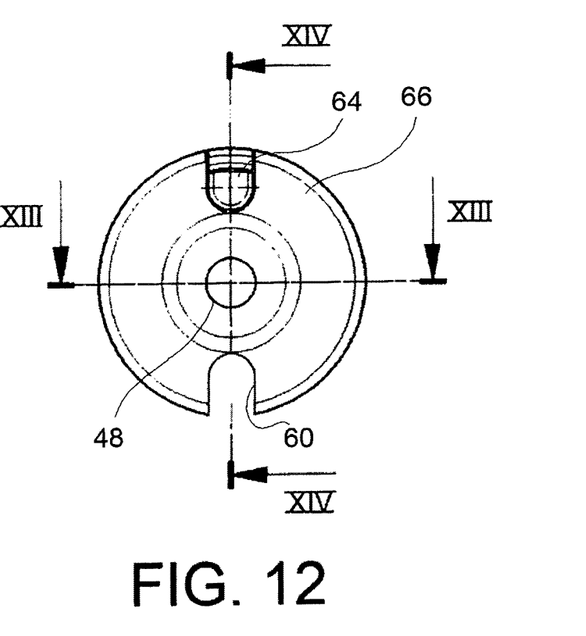
FIG. 12 illustrates a schematic view of a component of the device of FIG. 10.
Figure 13:
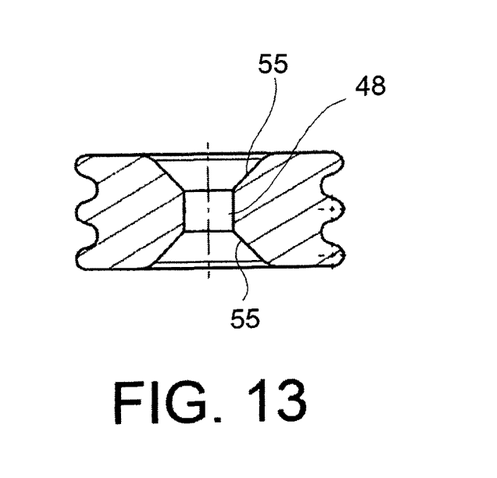
FIG. 13 illustrates a section view according to the line XIII-XIII of FIG. 12.
Figure 14:
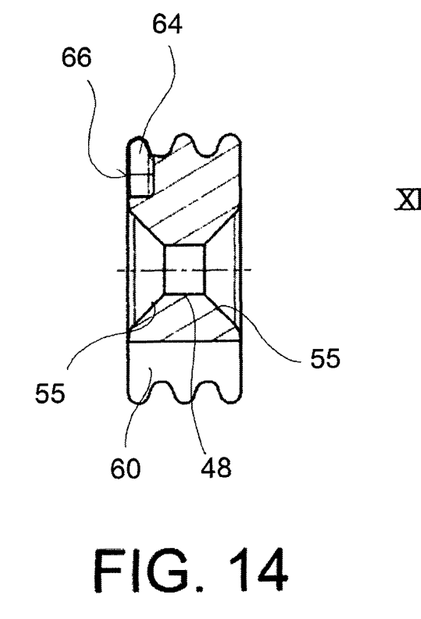
FIG. 14 illustrates a section view according to the line XIV-XIV of FIG. 12.

FIG. 9 as an example illustrates a portion of a caliper 12, partially sectioned to show the device 10. The caliper 12 is associated with a disc 14. Reference letter X indicates a rotation axis of the disc.

The caliper 12 comprises at least one pad 16 having a plate 18 and a layer of friction material 20. Moreover, the caliper 12 comprises at least one piston 22 of a cylinder 24, wherein the piston 22 is suitable for exerting a thrust on the pad 16, in particular on the plate 18, along a longitudinal direction of the cylinder/piston itself. In the example illustrated in FIG. 9, the caliper is of the hydraulic type and the piston is a component of the hydraulic braking system.

In accordance with a possible embodiment, the device 10 is suitable for being mounted between the pad 16 and the piston 22, as for example illustrated in FIG. 9. In particular, the device 10 is suitable for being mounted between the plate 18 of the pad 16 and the piston 22. It is possible to foresee calipers with a variable number of pistons and preferably one device 10 is foreseen for each piston.

Advantageously, the device 10 comprises at least one damper 26.

Such a damper has a substantially cylindrical configuration, by such a term meaning a configuration that extends along a longitudinal axis or direction L. Moreover, it is possible to identify at least one radial direction R, perpendicular to and incident with the longitudinal axis L and at least one tangential direction T, perpendicular to one of the radial directions R and not incident with the longitudinal direction L.

The term radial and tangential does not necessarily imply a reference to a right cylindrical configuration with a circular base although preferably the damper 26 has a substantially cylindrical configuration with circular base and with side wall having a configuration according to what is described hereafter.

With reference to the example illustrated in FIG. 9, the damper 26 is suitable for being mounted in the caliper 12 so that the longitudinal axis L is substantially perpendicular to the pad 16, at least in the portion with which it interacts, and parallel to a longitudinal direction of the piston 22. Again with reference to the example illustrated in FIG. 9, the damper 26 is suitable for being mounted in the caliper so that the longitudinal axis L is substantially parallel to the rotation axis X of the disc.

Advantageously, the damper 26 is suitable for being mounted with interference in a cavity 28 made in the piston 22. The cavity 28 has a substantially cylindrical configuration, according to the definition given above, with longitudinal axis parallel to the longitudinal axis of the damper in assembled configuration. Moreover, the cavity 28 is open towards the pad 16, in particular towards the plate 18 of the pad 16, to receive the damper 26.

With reference to FIGS. 2 and 5-7, advantageously the damper 26 has an interference surface 30 comprising at least one projection 32 that extends radially and that at least partially wraps around the damper 26 according to a direction having at least one tangential component. In accordance with a possible embodiment the damper 26 comprises at least one projection 32 that at least partially wraps around the damper 26 according to a tangential direction.

In accordance with a possible embodiment, the damper 26 comprises at least one annular projection 32 that extends preferably for the entire useful interference surface of the damper. By the term useful interference surface we mean the interference surface of the damper excluding possible cavities.

Advantageously, the damper 26 is suitable for being fixedly connected to the piston 22 through the aforementioned coupling by interference.

In other words, the radial dimensions of the damper 26, and in particular of the projection 32, are greater than the radial dimensions of the cavity 28 of the piston 22, in non-assembled condition.

In accordance with a possible embodiment, for example illustrated, the interference surface 30 comprises two or more projections 32 defining an undulating axial profile 34 of the interference surface 30. By the term "axial profile" we mean the profile obtained by sectioning the damper with a plane containing the longitudinal axis L as for example illustrated in FIG. 6 or 7.

Thanks to the provision of an undulating profile, the damper is firmly anchored with interference to its cavity foreseen in the piston and at the same time it is still free to deform both axially and radially to adequately perform its function as a damper, preventing the hooping of the seat on its entire interference surface from constraining the damper stiffening it excessively and reducing its deformation capability and therefore the damping effects.

According to a possible embodiment, the interference surface 30 comprises two or more projections 32 alternating with respective depressions 36.

With reference to the example illustrated in the figures, the interference surface 30 comprises three projections 32 defining an undulating axial profile 34 in which the three projections 32 are preferably alternated with respective depressions 36.

In accordance with a possible embodiment, a projection 32 has an at least partially curved axial profile preferably comprising at least one circumference portion 38. Advantageously, a projection 32 has a semi-circular axial profile. For example, a projection 32 can define a semi-toroidal structure that at least partially wraps around the damper.

Figure 1:
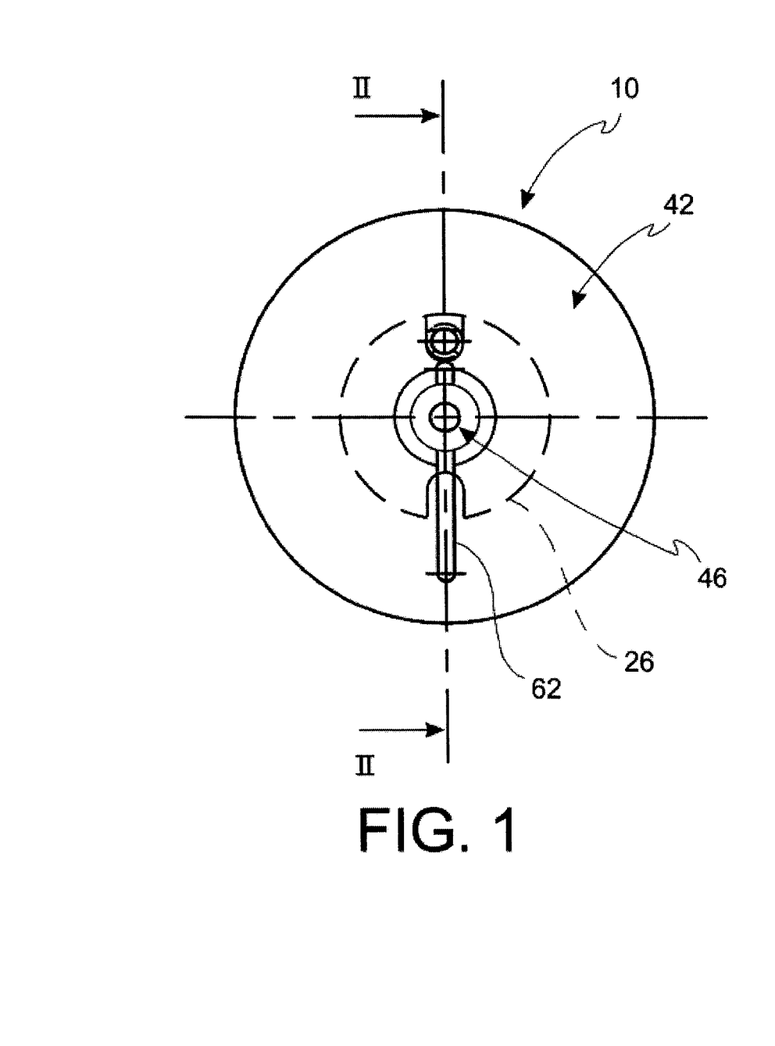
FIG. 1 illustrates a schematic view of a device according to the present invention.
Figure 2:
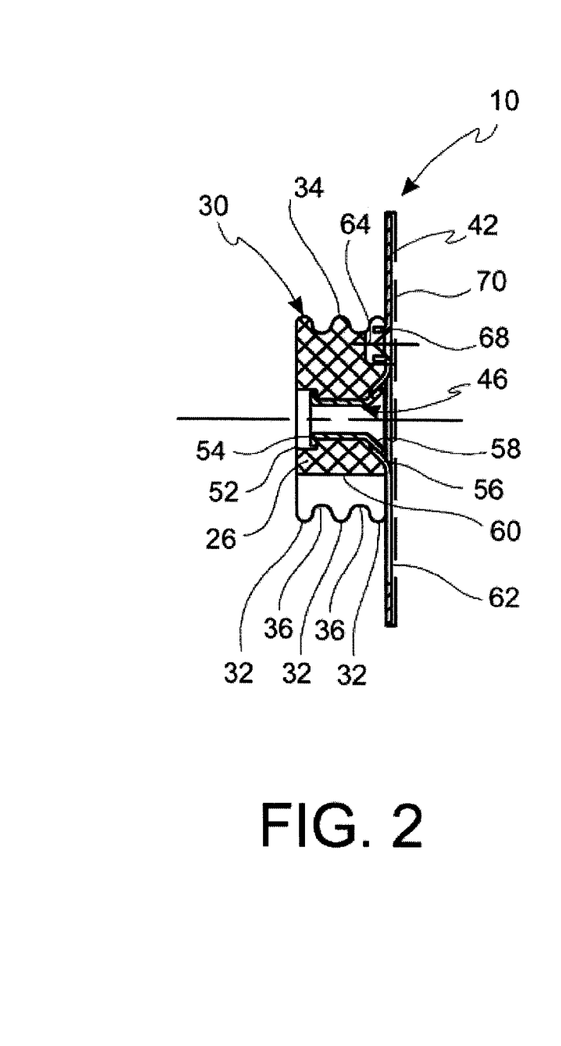
FIG. 2 illustrates a section view according to the line II-II of FIG. 1.
Figure 3:
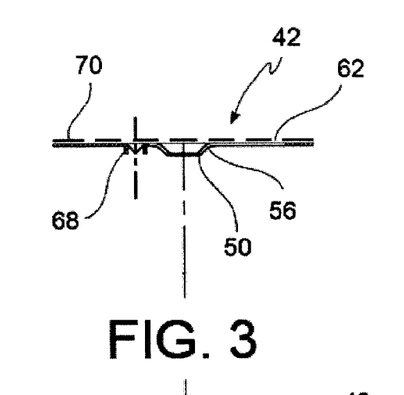
FIG. 3 illustrates a section view of a first component of the device of FIG. 1, according to the line III-III of FIG. 4.
Figure 4:
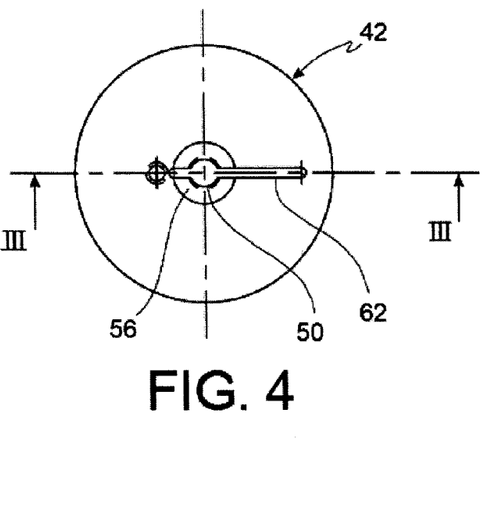
FIG. 4 illustrates a schematic view of a first component of the device of FIG. 1.
Figure 5:
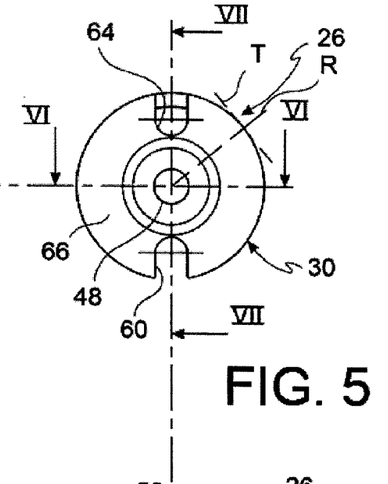
FIG. 5 illustrates a schematic view of a second component of the device of FIG. 1.
Figure 6:
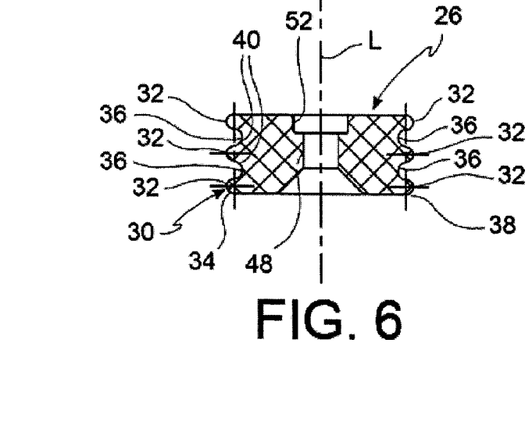
FIG. 6 illustrates a section view according to the line VI-VI of FIG. 5.
Figure 7:
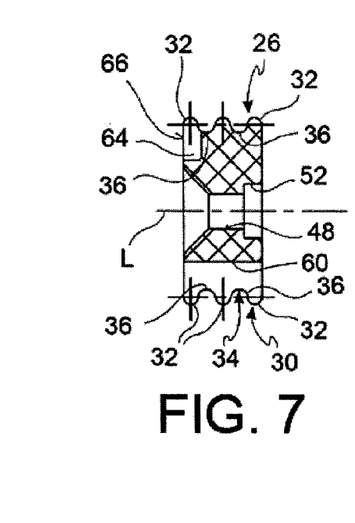
FIG. 7 illustrates a section view according to the line VII-VII of FIG. 5.

With reference to FIG. 6, the outer projections, i.e. proximal to the bases of the damper, have a semi-circular axial profile.

In accordance with a possible embodiment, a projection 32 has an axial profile comprising at least one rectilinear portion 40, for example connecting a circumference portion 38 to a depression 36. According to a possible embodiment, a projection 32 has an axial profile for example comprising an outer circumference portion 38 that connects to adjacent depressions through respective rectilinear portions 40 incident to one another, for example inclined with respect to one another by an angle of between 35° and 45°, preferably 40°. Advantageously, the two rectilinear portions are equally inclined with respect to a radial direction.

With reference to FIG. 6, the intermediate or central projection, i.e. the one located between the two outer projections, has an axial profile comprising two rectilinear portions 40 inclined with respect to one another and that join through a circumference portion 38.

In accordance with a possible embodiment, the device 10 comprises a plate-shaped element 42 suitable for being arranged between the piston and the pad 16, in particular between the piston and a surface 44 of the pad 16 opposite the layer of friction material 20 and suitable for being arranged on the opposite side to the disc 14.

Advantageously, the damper 26 and the plate-shaped element 42 are connected through at least one axial connection element 46. In accordance with a possible embodiment, the damper 26 and the plate-shaped element are connected through at least one axial tubular connection element. Preferably, the damper and the plate-shaped element are connected through at least one axial connection rivet.

In accordance with a possible embodiment, the axial connection element 46 passes through the damper 26 and the plate-shaped element 42 at respective axial through cavities 48, 50.

According to a possible embodiment, the axial cavity 48 of the damper 26 comprises a widened end 52 to receive a head 54 of the axial connection element 46. Advantageously, the head 54 abuts against the widened end 52. In accordance with a possible embodiment, the axial cavity 48 of the damper 26 comprises a countersunk portion 55 opposite the widened end 52, if present.

According to a possible embodiment, the plate-shaped element 42 comprises a countersunk portion 56 defining the axial through cavity 50 of the plate-shaped element itself. Advantageously, the countersunk portion 56 is suitable for defining an abutment portion for a deformation portion 58 of the axial connection element 46. The countersunk portion 55 of the damper 26 at least partially receives the countersunk portion 56 of the plate-shaped element 42 in assembled configuration of the device.

In accordance with a possible embodiment, the damper 26 comprises at least one discharge cavity 60 that opens at least on the interference surface 30. For example, the discharge cavity 60 extends axially for the entire height of the damper 26. Advantageously, the discharge cavity 60, in particular if extending axially along the height of the damper, has the function of compensating for the deformations both in the assembly step and in the operating step.

It is possible to advantageously foresee for the plate-shaped element 42 to comprise at least one venting opening 62 that for example intersects the axial through cavity 50, if foreseen. In accordance with a possible embodiment, the venting opening 62 is a radial slot, for example extending through the opening 50 and continuing on both sides of the same opening 50. Advantageously, the venting opening 62 extends at least in a radial direction of the plate-shaped element 42 for a section that exceeds the radial dimensions of the piston and preferably also of a dust guard 63 applied between cylinder and piston through rings 63a.

In the case in which both the discharge cavity 60 and the venting opening 62 are foreseen, in assembled condition of the device 10, the venting opening 62 of the plate-shaped element 42 corresponds to the discharge cavity 60 of the damper 26, or rather they at least partially face one another so as to leave a free passage in the substantially axial direction that continues radially through the venting opening 62. In other words, the venting opening 62 of the plate-shaped element 42, in particular in the form of a slot, performs a venting function of air that could accumulate inside the piston in certain conditions of the dust guard. Indeed, the air present between the rings 63a and the dust guard 63 can expand due to the high temperatures and inflate the dust guard until it touches the surface 44 of the pad, particularly when the pad is new. This would create a closed space between the dust guard 63, the surface 44 of the pad and the piston 22 in which the air expanded due to the high temperature could generate a pressure on the pad such as to push it against the disc generating a residual torque or it could make the piston draw back generating an unpleasant sensation the next time of braking.

In the case in which a tubular axial connection element 46 is foreseen, the venting opening 62 advantageously also extends to the through cavities 48, 50 to vent the air to the outside through the tubular axial connection element and the venting opening.

In accordance with a possible embodiment, the damper 26 comprises at least one positioning cavity 64 that opens at least on a base 66 of the damper 26 on the side of the plate-shaped element 42. Advantageously, the plate-shaped element 42 comprises at least one axial protuberance 68 suitable for inserting into the positioning cavity 64.

In accordance with a possible embodiment, the positioning cavity 64 extends axially for at least one portion of the height of the damper 26. Advantageously, the positioning cavity 64 can at least partially open on the interference surface 30.

With reference to the illustrated example, the axial protuberance 68 is formed by carving and folding the plate-shaped element 42.

According to a possible embodiment, the positioning cavity 64 of the damper 26 and the axial protuberance 68 of the plate-shaped element 42 are arranged so that the discharge cavity 60 of the damper 26 corresponds to the venting opening 62 of the plate-shaped element 42, or rather they at least partially face one another so as to leave a free passage in the substantially axial direction.

In accordance with a possible embodiment, for example illustrated, the positioning cavity 64 and the discharge cavity 60 are arranged substantially diametrically opposite.

Advantageously, the positioning cavity 64 of the damper 26 and the axial protuberance 68 of the plate-shaped element 42, suitable for inserting into the positioning cavity 64, perform the function of angular positioning and anti-rotation stop of the damper with respect to the plate-shaped element. The angular positioning is particularly useful in the case in which it is foreseen for there to be the discharge cavity 60 of the damper 26 and the venting opening 62 of the plate-shaped element 42 to ensure the venting of air inside the piston.

Advantageously, the damper 26 and the plate-shaped element 42 are fixedly connected axially through the axial connection element 46 (or axial tubular connection element or axial connection rivet). The coupling between the positioning cavity 64 of the damper 26 and the axial protuberance 68 of the plate-shaped element 42 ensures the rotational connection between the damper 26 and the plate-shaped element 42.

In accordance with a possible embodiment, the plate-shaped element 42 comprises an adhesive surface 70 suitable for adhering to the surface 44 of the pad 16. More generally the plate-shaped element 42 comprises connection means to the surface 44 of the pad 16 opposite the disc.

According to a possible embodiment, the damper 26 is made from rubber, for example EPDM rubber preferably with hardness 60 Sh A.

According to a possible embodiment, the plate-shaped element 42 is made from damping plate, or rather stratified material made from steel and rubber (with many alternating layers) for example called shim.

Advantageously, the present invention also concerns a caliper of a disc brake comprising a device for damping the vibrations in a pad having one or more of the characteristics described above.

Hereafter the assembly of the device 10 and its mounting on the caliper, for example the caliper 12 illustrated in FIG. 9, is described.

In accordance with a possible embodiment, the damper 26 and the plate-shaped element 42 are brought together, so that the axial protuberance 68 of the plate-shaped element 42 inserts into the positioning cavity 64 of the damper 26, if present. The axial connection element 46 is introduced through the respective axial through cavities 48, 50 of the damper 26 and of the plate-shaped element 42. In particular, the axial connection element 46 (rivet) is slotted into the device 10 for example on the side of the damper 26, according to what has been illustrated in the attached figures, until the head 54 abuts against the widened end 52. Then the axial connection element 46 is deformed, in particular countersunk, for example to form the deformation portion 58 and fixedly connect at least axially the damper 26 and the plate-shaped element 42.

In the step of mounting onto the caliper of the device 10, the damper 26 is inserted with interference into the cavity 28 of the piston 22 for which reason the device 10 and the piston are fixedly connected to one another. The discharge cavity 60, if present, compensates for the possible deformations in the mounting step.

When the system is put under pressure, the pad 16 is fixedly connected to the device 10 for example through the adhesive surface 70 for which reason the pad 16 is fixedly connected to the piston optimising the damping.

In the case of replacement of the pad the device 10 can be integrally replaced.

Hereafter, the operation of the device 10 is described.

During the braking step, the device 10 performs the function of limiting the vibrations and the consequent whistling due to the oscillations of the caliper and of the pads. The damping effect is optimised by fixedly connecting the pad to the piston through a connection by interference between the damper and the piston. This solution decreases the noisiness of the caliper thanks to the fact that the device 10 is fixedly connected (glued) to the pad and mounted with interference in the piston, creating a damping layer between pad and caliper. Such a damping layer fixedly connected both to the pad and to the piston is able, during braking, to reduce the acceleration that the pad undergoes following braking torque, by a value that is proportional to the hardness of the material of the damper (rubber) and to the extent of interference between damper and piston.

From what have been mentioned so far it can be appreciated how the fact of foreseeing a device for damping the vibrations in a pad of a disc brake according to the present invention makes it possible to avoid the aforementioned requirement of avoiding annoying whistling due to the vibrations of the caliper and of the pads.

It is also particularly advantageous for there to be a discharge cavity in the damper that is able to compensate for the deformations both during assembly and during operation.

A further advantage is achieved thanks to the presence of the venting opening in the plate-shaped element, in particular if coupled with a cavity for example a discharge cavity of the damper or with a tubular connection element, which allows the air that could accumulate inside the piston to vent freely.

The presence of an axial connection element makes it possible to obtain a mainly axial constrainment that is easy to obtain. Moreover, the presence of the coupling between the positioning cavity of the damper and the protuberance of the plate-shaped element can, if required, ensure the correct angular positioning and an anti-rotation stop, particularly useful for example in the case in which it is foreseen for there to be the discharge cavity of the damper and the venting opening of the plate-shaped element.

Moreover, the axial connection element and the coupling between the positioning cavity of the damper and the protuberance of the plate-shaped element ensure the complete fixed connection between the damper and the plate-shaped element. In this case it is advantageous to have a device for damping the vibrations in a pad of a disc brake according to what has been described earlier, in which the device comprises a plate-shaped element suitable for being arranged between a surface of the pad, suitable for being arranged on the opposite side to the disc, and the piston and in which the damper and the plate-shaped element are axially fixedly connected through at least one axial connection element and in which the damper and the plate-shaped element comprise a further coupling suitable for making an angular positioning and an anti-rotation step, for example the coupling between the positioning cavity of the damper and the protuberance of the plate-shaped element. However, other embodiments of coupling suitable for making an angular positioning and an anti-rotation step are possible.

It is clear that variants and/or additions to what has been described and illustrated above can be foreseen. For example, the described device can be applied to fixed calipers or to floating calipers. Moreover, the device 10 can be applied to hydraulic calipers or also calipers comprising actuators of another kind, for example mechanical or electric. In this case, however it is actuated, it is possible to define a thruster or piston acting upon the pad and the described device can be inserted between such a thruster and the pad.

For example, it is possible to foresee different configurations of the damper. Irrespective of the form used the definition of longitudinal axis or direction L, of radial direction R, and of tangential direction T remain valid, not implying any kind of limitation to the form of the damper.

The interference surface can have a variable number of projections. In particular, there can be one or more projections, for example at least three projections having optional characteristics as described earlier.

Each projection can have an axial profile comprising a variously configured outer portion that connects to adjacent depressions for example through respective rectilinear portions for example incident with respect to one another. The outer portion of the projection can be variously configured, for example it can be curvilinear or it can be rectilinear and possibly arranged parallel to the longitudinal axis of the damper.

According to a possible embodiment, the damper has an interference surface comprising at least one projection that extends radially and that at least partially wraps around the damper according to a direction having at least one tangential component, for example a slightly helical annular projection.

In accordance with a possible embodiment, the positioning cavity and the discharge cavity of the damper can coincide simultaneously carrying out the air venting, angular positioning and anti-rotation stop functions.

Figure 8:
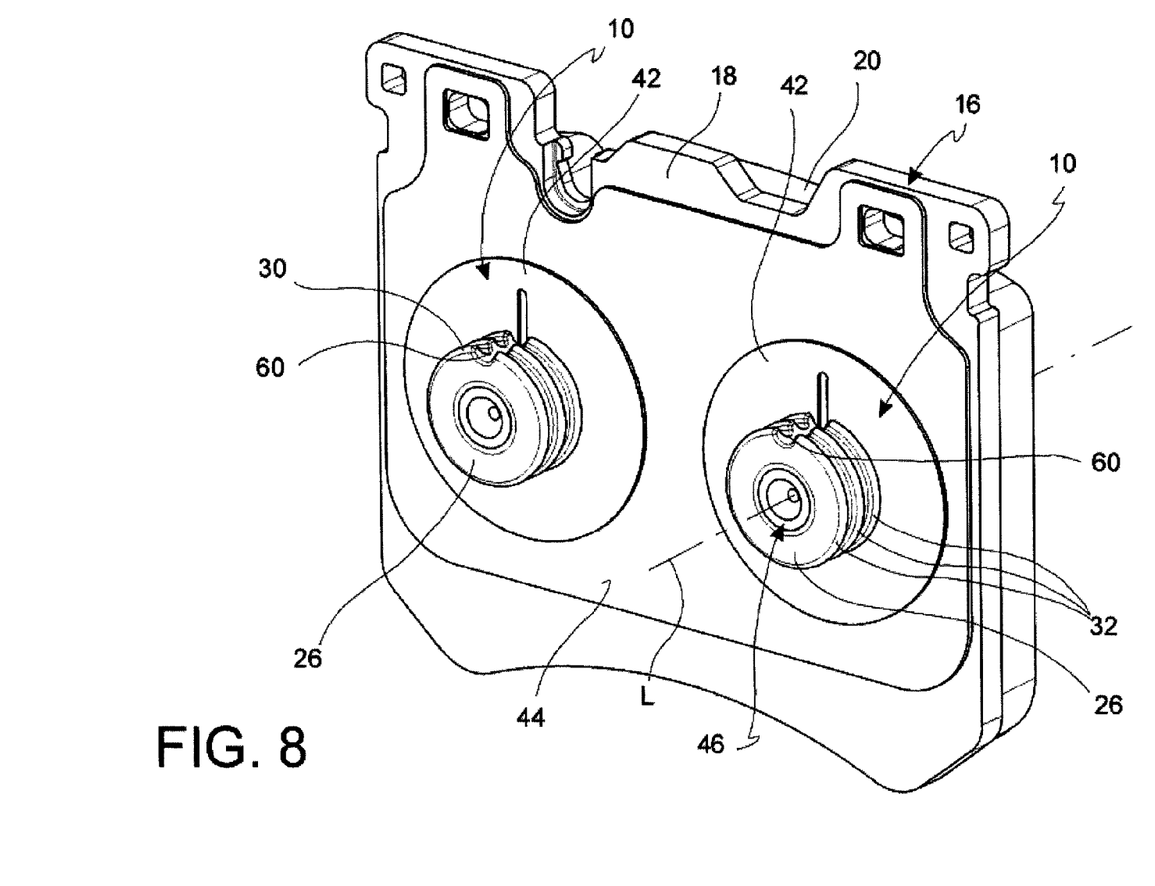
FIG. 8 illustrates a schematic perspective view of a device according to the present invention associated with a pad of a disc brake.

FIG. 8 and thereafter illustrate a possible variant of the shape of the damper 26. According to the illustrated embodiment, the axial cavity 48 of the damper 26 comprises a countersunk portion 55 on both sides. Similarly, the axial connection element 46 comprises two deformation portions 58 on both sides.

In accordance with a possible embodiment, not illustrated, the damper 26 can comprise two positioning cavities 64 arranged on opposite bases of the damper itself, for example along the same axial direction, so as to be able to mount the damper both ways along the axial direction.

In accordance with a possible embodiment, the plate 18 of the pad 16 can have inclined sections with respect to the rotation axis of the disc at the surface 44 opposite the disc. In the case in which the piston acts at said inclined sections, the longitudinal axis L of the device 10 will be arranged inclined with respect to the axis X whilst still remaining parallel to the longitudinal axis of the piston.

Possibly, it is advantageous to foresee a device as described earlier, in which the connection between the damper and the plate-shaped element is obtained through an axial connection element (rivet) irrespective of the other described characteristics (for example the connection by interference between damper and piston, the discharge cavity of the damper and the venting opening of the plate-shaped element, the positioning cavity of the damper and the protuberance of the plate-shaped element).

Possibly, it is possible to foresee a device 10 as described earlier, in which the damper comprises a discharge cavity and the plate-shaped element comprises a venting opening irrespective of the other characteristics described (for example the connection by interference between damper and piston, the positioning cavity of the damper and the protuberance of the plate-shaped element, the connection through axial connection element).

Possibly, a device 10 can be foreseen as described earlier comprising a coupling suitable for obtaining an angular positioning and an anti-rotation stop (in which for example the damper comprises the positioning cavity and the plate-shaped element comprises the axial protuberance) irrespective of the other characteristics described (for example the connection by interference between damper and piston, the discharge cavity of the damper and the venting opening of the plate-shaped element, the connection through axial connection element).

The man skilled in the art can bring numerous modifications, adaptations and replacements of elements with other functionally equivalent ones to the preferred embodiment of the device for damping the vibrations in a pad of a disc brake described above, in order to satisfy contingent and specific requirements, without however departing from the scope of protection of the following claims.

The invention claimed is:

1. Device for damping the vibrations in a pad of a disc brake comprising at least one pad and at least one piston suitable for exerting a thrust on said pad, said device being suitable for being mounted between said at least one pad and said at least one piston, wherein said device comprises at least one substantially cylindrical damper suitable for being mounted with interference in a cavity made in the piston, said damper having an interference surface comprising at least one projection that extends radially and that at least partially wraps around the damper according to a direction having at least one tangential component, and wherein said damper is suitable for being fixedly connected to the piston through said coupling by interference wherein said interference surface comprises two or more projections defining an undulating axial profile of said interference surface, and wherein said device further comprises a plate-shaped element suitable for being arranged between a surface of the pad, suitable for being arranged on the opposite side to the disc, and wherein the piston, said damper and said plate-shaped element are connected through at least one axial connection element.

2. Device for damping the vibrations in a pad of a disc brake according to claim 1, wherein said axial connection element crosses said damper and said plate-shaped element at respective axial through cavities.

3. Device for damping the vibrations in a pad of a disc brake according to claim 2, wherein said axial cavity of said damper comprises a widened end to receive a head of said axial connection element, said head abutting against said widened end.

4. Device for damping the vibrations in a pad of a disc brake according to claim 2, wherein said plate-shaped element comprises a countersunk portion defining said axial through cavity, said countersunk portion being suitable for defining an abutment portion for a deformation portion of said axial connection element, said countersunk portion of the plate-shaped element being suitable for being at least partially received in a possible countersunk portion of the damper.

5. Device for damping the vibrations in a pad of a disc brake according to claim 1, wherein said damper comprises at least one discharge cavity that opens at least on said interference surface.

6. Device for damping the vibrations in a pad of a disc brake according to claim 1, wherein said device comprises a plate-shaped element suitable for being arranged between a surface of the pad, suitable for being arranged on the opposite side to the disc, and the piston, and wherein said plate-shaped element comprises at least one venting opening.

7. Device for damping the vibrations in a pad of a disc brake according to claim 6, wherein said venting opening of said plate-shaped element corresponds to the discharge cavity of the damper.

8. Device for damping the vibrations in a pad of a disc brake according to claim 1, wherein said device comprises a plate-shaped element suitable for being arranged between a surface of the pad, suitable for being arranged on the opposite side to the disc, and the piston and wherein said damper comprises at least one positioning cavity that opens at least on a base of the damper on the side of the plate-shaped element, said plate-shaped element comprising at least one axial protuberance suitable for inserting into said positioning cavity.

9. Device for damping the vibrations in a pad of a disc brake according to claim 8, wherein said positioning cavity and said discharge cavity are arranged substantially diametrically opposite.

10. Device for damping the vibrations in a pad of a disc brake according to claim 6, wherein said positioning cavity of the damper and said axial protuberance of said plate-shaped element are arranged so that said discharge cavity of the damper corresponds to said venting opening of the plate-shaped element.

11. Device for damping the vibrations in a pad of a disc brake according to claim 1, wherein said at least one projection has an at least partially curved axial profile.

12. Device for damping the vibrations in a pad of a disc brake according to claim 1, wherein said at least one projection has an axial profile comprising an outer circumference portion that connects to adjacent depressions through respective rectilinear portions inclined with respect to one another by an angle of between 35° and 45°.

13. Device for damping the vibrations in a pad of a disc brake according to claim 1, wherein said damper has an axial profile comprising at least three projections, wherein the two outer projections have a semi-circular axial profile and wherein the at least one intermediate projection has an axial profile comprising two rectilinear portions inclined with respect to one another and that join through a circumference portion.

14. Device for damping the vibrations in a pad of a disc brake according to claim 1, wherein said device comprises a plate-shaped element suitable for being arranged between a surface of the pad, suitable for being arranged on the opposite side to the disc, and the piston, wherein said plate-shaped element comprises at least one venting opening associated with at least one protuberance and wherein said damper comprises at least one positioning and discharge cavity suitable for receiving said protuberance for which reason said venting opening and said positioning and discharge cavity correspond to one another.

15. Device for damping the vibrations in a pad of a disc brake according to claim 1, wherein said device comprises a plate-shaped element suitable for being arranged between a surface of the pad, suitable for being arranged on the opposite side to the disc, and the piston, said damper and said plate-shaped element being firmly fixed axially through at least one axial connection element and wherein said damper and said plate-shaped element comprise a further coupling suitable for making an angular positioning and an anti-rotation stop.

16. Caliper of a disc brake comprising a device for damping the vibrations in a pad according to claim 1, said caliper comprising at least one pad and at least one piston suitable for exerting a thrust on said pad, said device being mounted between said at least one pad and said at least one piston, wherein said device comprises at least one substantially cylindrical damper mounted with interference in a cavity made in the piston, said damper having an interference surface comprising at least one projection that extends radially and that at least partially wraps around the damper according to a direction having at least one tangential component, and wherein said damper is fixedly connected to the piston through said coupling by interference.

17. Device for damping the vibrations in a pad of a disc brake according to claim 1, wherein said axial connection element comprises a rivot.

18. Device for damping the vibrations in a pad of a disk brake according to claim 1, wherein said plate-shaped element has an adhesive surface for adhering to said surface of the pad opposite the disc.

19. Device for damping the vibrations in a pad of a disc brake according to claim 5, wherein said discharge cavity extends axially for the entire height of the damper.

20. Device for damping the vibrations in a pad of a disc brake according to claim 6, wherein said venting opening intersects an axial through cavity of said plate-shaped element.

21. Device for damping the vibrations in a pad of a disc brake according to claim 20, wherein said venting opening is radial slot.

22. Device for damping the vibrations in a pad of a disc brake according to claim 8, wherein said positioning cavity extends axially for at least a portion of the height of the damper and wherein said positioning cavity opens on said interference surface.

23. Device for damping the vibrations in a pad of a disc brake according to claim 11, wherein said projection has a semi-circular axial profile.

* * * * *